(12) United States Patent
Brandenburg

(10) Patent No.: US 7,037,484 B1
(45) Date of Patent: May 2, 2006

(54) PLASMA REACTOR FOR CRACKING AMMONIA AND HYDROGEN-RICH GASES TO HYDROGEN

(75) Inventor: John E. Brandenburg, Cape Canaveral, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 432 days.

(21) Appl. No.: 10/465,044

(22) Filed: Jun. 19, 2003

Related U.S. Application Data

(60) Provisional application No. 60/390,555, filed on Jun. 21, 2002.

(51) Int. Cl.
*C01B 3/02* (2006.01)

(52) U.S. Cl. .................. 423/648.1; 423/351; 423/650; 423/658.2; 204/157.52; 204/164

(58) Field of Classification Search ............. 423/648.1, 423/650, 351, 658.2; 204/157.52, 164
See application file for complete search history.

(56) References Cited

U.S. PATENT DOCUMENTS

| | | | |
|---|---|---|---|
| 4,180,552 A | 12/1979 | Graham et al. | 423/359 |
| 4,180,553 A | 12/1979 | Null et al. | 423/359 |
| 4,435,374 A * | 3/1984 | Helm, Jr. | 423/418.2 |
| 4,544,527 A * | 10/1985 | Meyerhoff | 422/188 |
| 5,266,175 A | 11/1993 | Murphy | 204/157.43 |
| 5,411,649 A | 5/1995 | Roussy et al. | 204/157.43 |
| 5,956,938 A | 9/1999 | Brandenburg | 60/203.1 |
| 6,205,769 B1 | 3/2001 | Brandenburg et al. | 60/203.1 |
| 6,245,309 B1 | 6/2001 | Etievant et al. | 423/248 |
| 6,527,980 B1* | 3/2003 | Roden et al. | 252/373 |
| 6,884,326 B1* | 4/2005 | Futamura et al. | 204/164 |
| 6,923,890 B1* | 8/2005 | Ricatto et al. | 204/164 |
| 2002/0146366 A1* | 10/2002 | Cha | 423/650 |

* cited by examiner

*Primary Examiner*—Stanley S. Silverman
*Assistant Examiner*—Timothy C. Vanoy
(74) *Attorney, Agent, or Firm*—Brian S. Steinberger; Law Offices of Brian S. Steinberger, P.A.

(57) ABSTRACT

Processes and systems for generating hydrogen gas from resonant cavities are disclosed. A preferred version includes separating a resonant cavity into two compartments with a dielectric type diaphragm, injecting gases such as ammonia into one compartment and generating electromagnetic energy from an antenna, microwave generator or waveguide into the other compartment so that a plasma discharge is formed in the cavity, and hydrogen gas can be selectively released from an outport of the cavity.

8 Claims, 2 Drawing Sheets

PLASMA REACTOR FOR CRACKING AMMONIA AND HYDROGEN-RICH GASES TO HYDROGEN

This invention claims the benefit of priority to U.S. Provisional patent application 60/390,555 filed Jun. 21, 2002.

FIELD OF THE INVENTION

This invention relates to hydrogen generation, in particular to systems and methods for generating hydrogen from interacting electromagnetic energy with ammonia gas or other hydrogen-rich gases in a reactive chamber.

BACKGROUND AND PRIOR ART

Hydrogen appears to be a very promising fuel for the energy needs of mankind. Use of hydrogen fuels would require only minor modifications to existing engine and power plant designs. In alternative propulsion technologies, such as electric vehicles, hydrogen can be used in fuel cells.

One problem with hydrogen, however, is the safe handling of it. The use of hydrogen as a fuel for widespread distribution in either gaseous or liquid form poses numerous safety, technical, and economic problems that make its use as a fuel prohibitively difficult. In the absence of a hydrogen pipeline network, small-scale users purchase commercial hydrogen as compressed gas in steel cylinders, or as liquid hydrogen in cryogenic containers. One approach to resolve the drawbacks of hydrogen as a fuel includes considering less expensive, simpler, and cheaper materials that can act as a hydrogen carrier and generate hydrogen on demand.

Several on-site methods of producing hydrogen are known, including, reforming of natural gas or hydrocarbons; using permeators to selectively separate hydrogen from ammonia synthesis processes (U.S. Pat. Nos. 4,180,552 and 4,180,553), water electrolysis, and ammonia dissociation or cracking. Reformers have existed to thermally decompose ammonia to produce hydrogen (U.S. Pat. No. 4,704,267). However, the reformers must create heat in closed spaces, which leads to substantial amounts of heat losses. Additionally, heat reformers have inherent limitations as to where they can be used.

Ammonia has been identified as a suitable hydrogen carrier. Ammonia is essentially non-flammable and is readily obtained and handled without need for expensive and complicated technology. In addition, ammonia contains 1.7 times as much hydrogen as liquid hydrogen for a given volume. Compared to liquid hydrogen, ammonia therefore offers significant advantages in cost and convenience as a fuel due to its higher density and its easier storage and distribution. Ammonia is produced and distributed worldwide in millions of tons per year. Procedures for safe handling have been developed in every country. Facilities for storage and transport by barges, trucks and pipelines from producer to ultimate consumer are available throughout the world. Further advantages of ammonia for fuel cells are given in an easy cracking device. Ammonia can be cracked into hydrogen and nitrogen in a suitable separation unit according to the reaction: $2\ NH_3 \rightarrow 3\ H_2 + N_2$.

Alternatively, natural gas, primarily $CH_4$ or methane which, though difficult to store, is widely available through pipelines and can be cracked similarly. The cracking reaction is: $CH_4 \rightarrow C + 2H_2$, with carbon being removed as soot.

SUMMARY OF THE INVENTION

The first objective of the present invention is to provide a process and system to generate hydrogen from ammonia type gas in concentrated zones, which is more efficient than conventional ammonia reformers.

The second objective of the present invention is to provide a process and system to generate hydrogen as a fuel in places that would previously have been considered impractical.

The third objective of the present invention is to provide a process and system to generate hydrogen that can break down gas such as ammonia in one pass completely with all heat going into the ammonia and little heat escaping the system.

The fourth objective of this invention is to provide a process and system to generate hydrogen on demand from an easily storable source.

The fifth objective of this invention is to allow humans to identify the presence of hydrogen by smelling chemicals, such as ammonia.

The preferred embodiment of the present invention uses anhydrous ammonia, which is a cheap, easy to handle raw material in a cracking process that produces hydrogen on demand.

The invention allows instant identification of the presence of hydrogen by interacting or using chemicals, such as, but not limited to, ammonia, natural gas, and the like.

A method and system for generating hydrogen gas comprises the step of injecting a hydrogen-rich gas, such as ammonia or methane into a resonant cavity with a microwave generator on one end, a collection of plasma particles at the opposite end, and a dielectric diaphragm to keep the plasma particles confined to the reaction chamber of the resonant cavity. Subsequent to injecting a hydrogen-rich gas into the resonant cavity, electromagnetic energy is applied to the inside portion of the cavity and a plasma discharge is formed by the interaction of the electromagnetic energy and the injected gas. The plasma discharge effectively cracks the hydrogen-rich gas thereby releasing hydrogen gas, which is emitted from the cavity.

Further objects and advantages of this invention will be apparent from the following detailed description of a presently preferred embodiment, which is illustrated, schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
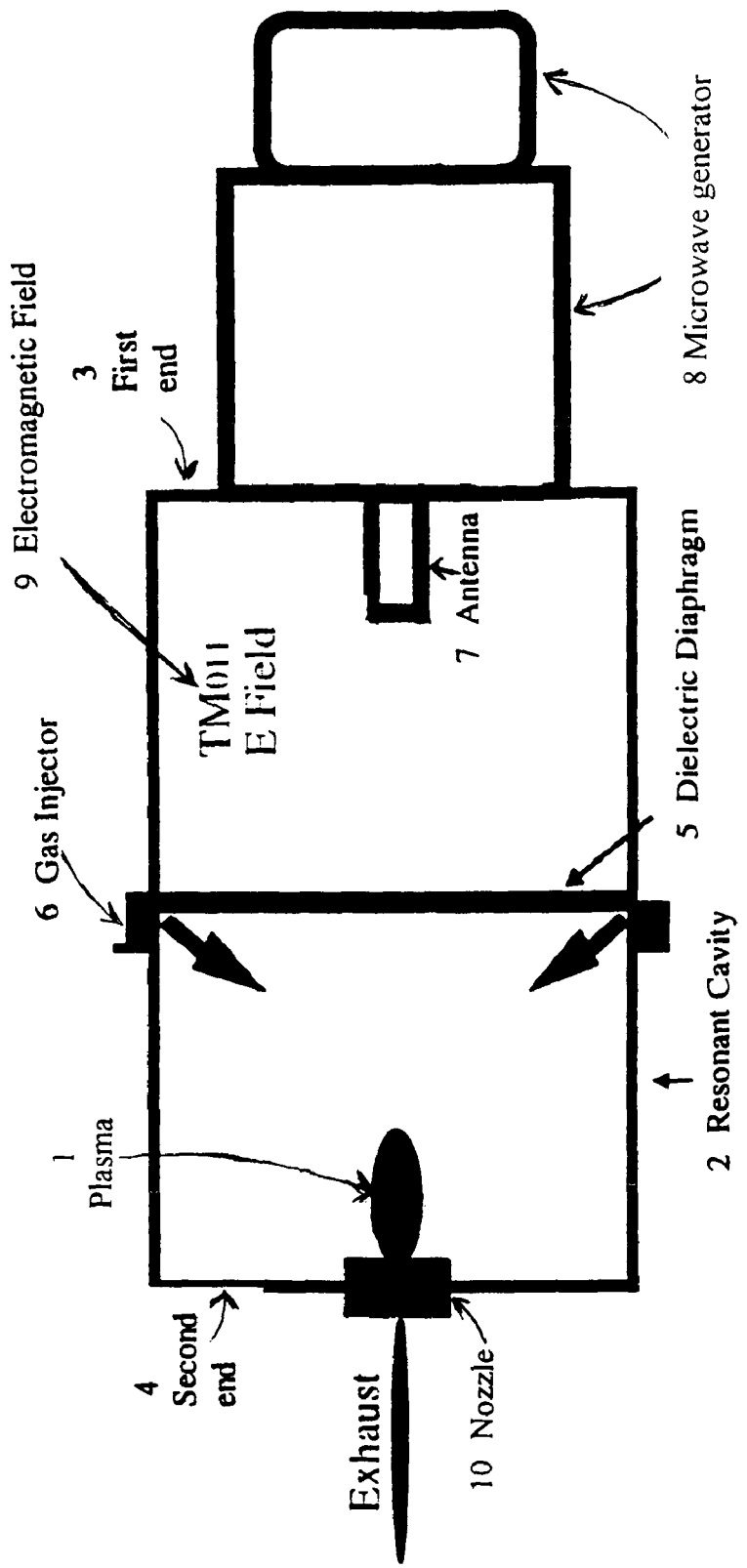
FIG. 1 shows a schematic diagram of the plasma reactor assembly.

Referring to FIG. 1, a MEVA (Microwave Electrodeless Vortex Arc) device (1) can have outer walls constructed of any metal that is a good conductor of electricity. The choice of metal and surface coating, would depend on the chemicals being processed. For example, for the cracking of ammonia, stainless steel or nickel would be preferred. For less corrosive chemicals, such as natural gas, the MEVA could be constructed of aluminum.

The MEVA device can include an approximately resonant cavity (2) having a first end (3) and a second end (4), and the space between these two ends are divided into two portions by a dielectric diaphragm (5). The dielectric diaphragm is made of chemically resistant plastic material such as TEFLON®, a synthetic fluorine-containing resin or boron nitride. The diaphragm serves as a barrier that keeps the plasma at the second end (4) from making direct contact with the antenna at the first end (3).

At least one injector port opening (6) in the cavity (2) is positioned for the injection of ammonia or natural gas in the form of a gas (as shown). A microwave antenna (7) carried by the first end (3) of the cavity (2) is a metal stub made of a conductive metal. As an example, the conductive metal could be copper or aluminum. The microwave antenna (7) can be coupled to a microwave generator (8) which generates microwaves which are emitted into a cavity (2) where they create a field pattern TM011 E Field (9) of electromagnetic energy to interact with the plasma (1) and heat the gas so as to create hydrogen by thermal decomposition of the injected gas. A nozzle (10) carried by the second end (4) of the cavity (2) allows for the exit of the reaction products. In the case of both ammonia and natural gas or methane, the other chemical products created by the decomposition of the gases are separated from the hydrogen in the effluent. Ammonia dissociates into hydrogen and nitrogen. Nitrogen is a natural constituent of the atmosphere and can be vented into the air or separated from hydrogen using a selective membrane. The decomposition of methane yields hydrogen and a tarry carbonaceous substance, primarily carbon graphite, commonly known as, soot. As the gases and other deposits exit the cavity (2), the hydrogen can be used as fuel for a fuel cell or other hydrogen utilizing processes.

Figure 2:
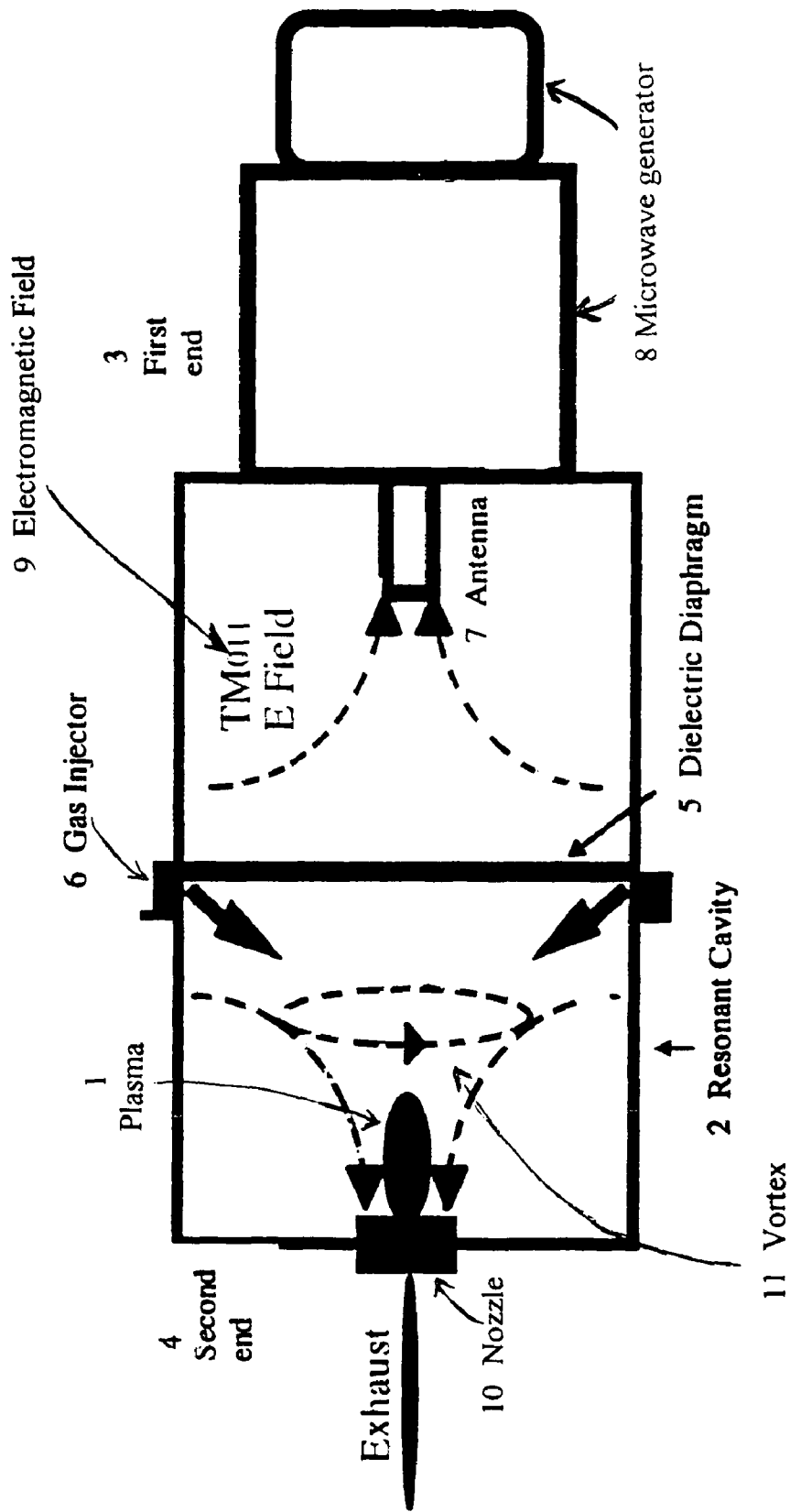
FIG. 2 shows a vortex arc formed at the plasma end of the reaction chamber.

FIG. 2 shows a preferred device that can be a vortex stabilized electrodeless microwave plasma discharge created in a resonant cavity that can be directly driven by a magnetron type microwave tube. The vortex forms around the plasma and can function to separate the gases in the reaction chamber. The novel invention can be built to run at various sizes and powers. For example, approximately 200 W at approximately 7.5 GHz, approximately 1 kW at approximately 2.45 GHz, an approximately 50 kW at approximately 0.915 GHz have been demonstrated using air and other gases.

A commercial use of this invention can allow for ammonia, preferably anhydrous ammonia, to be used as a carrier of hydrogen. As is well known ammonia can be smelled, and more easily stored than hydrogen. The invention can allow for ammonia gas to be converted into hydrogen and nitrogen on demand. Since nitrogen is a natural constituent of the atmosphere, the excess nitrogen can be vented into the atmosphere; thus, creating no undesirable pollution.

The plasma reactor of this invention is designed for use as a fuel source in a fixed location, including, but not limited to, engines, power plants for universities, hospitals, municipalities, and the like. A hydrogen product stream can be produced on demand in a very energy efficient and rapid operation. The plasma reactor breaks down ammonia in one pass completely, with all heat going into the ammonia and little escaping.

EXAMPLE 1

In its ultimate development, assuming sources of energy inefficiency and unnecessary gas heating are eliminated, the plasma cracker processes, in the case of ammonia, approximately one (1) liter per second of ammonia gas is fed into the reaction chamber and consumes two kilowatts (2 kW) of power to perform this processing. The hydrogen gas exhausts into a low pressure chamber to cool it for use in a fuel cell or storage for later use. The chemically free hydrogen, is released at a rate of 1.5 liters a second, and can be combusted in a fuel cell to produce power at high efficiency (80% assumed) and release, in turn, 12 kilowatts of power. Thus, 12 kW of power can be released by an investment of 2 kW. This is an energy multiplication factor of six (6).

In early versions of our experiment with lower energy multiplication factors, the plasma cracker is used to facilitate the storage of hydrogen in the form of ammonia with hydrogen being made "just in time" for use as rocket fuel or in refueling pure hydrogen powered vehicles.

EXAMPLE 2

For the case of natural gas or methane, the rate of gas processing at one (1) liter per second, requires approximately 3 kilowatts (3 kW), due to the higher binding energy of methane but will produce approximately 16 kW of electrical power when processed in a high efficiency fuel cell. The process of plasma cracking can produce a factor of energy multiplication of approximately 6 times, assuming energy efficiencies of 80% in fuel cells.

Inefficient processes in the plasma cracker can result in lower gas processing rates for the gas at fixed powers and yield lower energy multiplication factors.

Although the preferred embodiment describes using ammonia as the injected gas, other types of hydrogen-containing gases can be used, for example, natural gas and water vapor. Natural gas can be delivered to the reaction chamber via pipelines that are well established in many parts of the world. Argon, helium, nitrogen, and combinations thereof, can also be used as a non-reactive gas to promote the stability of the plasma and run the reactor at a lower power. However, this would generate another gas to separate and handle for, either, reuse or disposal in the effluent.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of generating hydrogen, comprising the steps of:
   providing a resonant cavity having a first end and a second end and the space between the two ends divided into two portions by a dielectric diaphragm;
   injecting gas into the second end of the cavity;
   applying electromagnetic energy to an inside portion of the first end of the cavity;
   forming a plasma discharge inside the second end of the cavity by interaction of the electromagnetic energy and the injected gas; and
   emitting hydrogen gas out of the cavity.

2. The method of claim 1, wherein the gas includes: ammonia.

3. The method of claim 1, wherein the gas is a hydrogen-containing gas selected from at least one of: air, natural gas, methane and water vapor.

4. The method of claim 1, further including the step of:
generating the electromagnetic energy from an antenna.

5. The method of claim 1, further comprising the step of:
generating the electromagnetic energy from a microwave generator.

6. The method of claim 1, further comprising the stop of injecting a non-reactive gas to promote the stability of the plasma.

7. The method of claim 6, wherein the non-reactive gas is selected from the group consisting of argon, helium, nitrogen, and combinations thereof.

8. The method of claim 1, wherein the dielectric diaphragm is made of chemically resistant plastic material.

\* \* \* \* \*